(No Model.) 3 Sheets—Sheet 3.

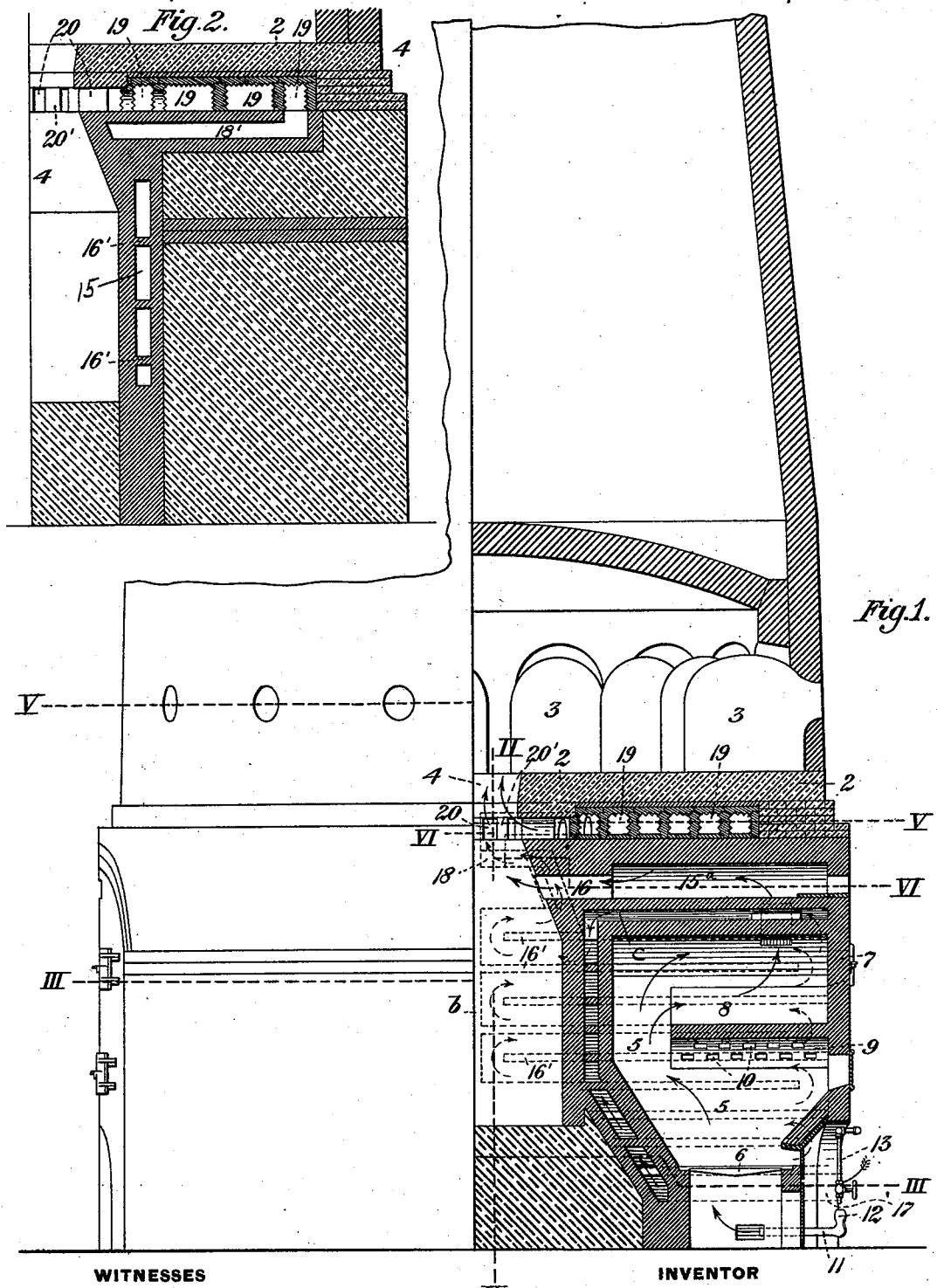

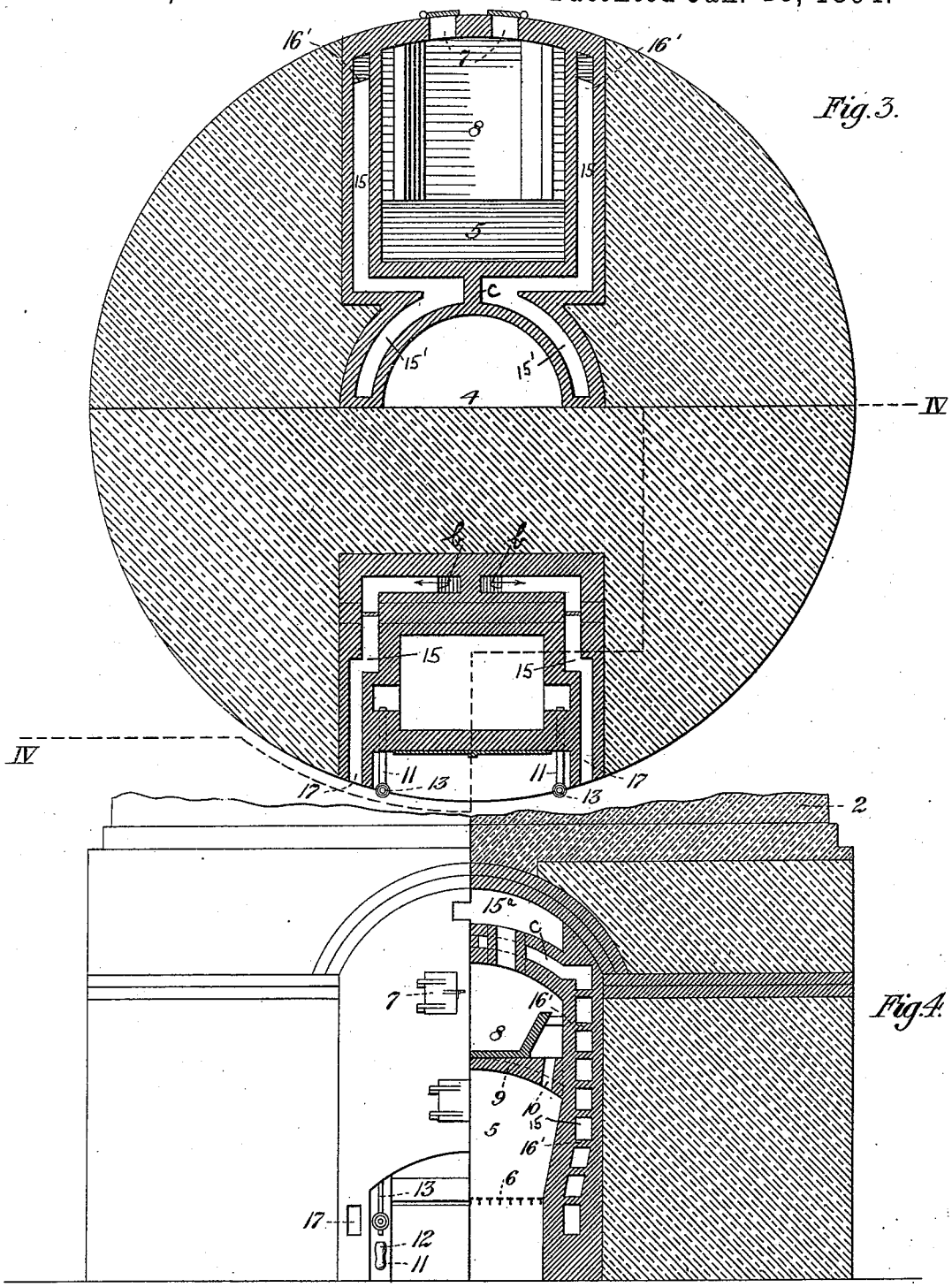

A. M. BACON.
GLASS MELTING FURNACE.

No. 512,791. Patented Jan. 16, 1894.

WITNESSES
Thomas W. Bakewell
C. M. Clarke

INVENTOR
Addison M. Bacon.

UNITED STATES PATENT OFFICE.

ADDISON M. BACON, OF PITTSBURG, PENNSYLVANIA.

GLASS-MELTING FURNACE.

SPECIFICATION forming part of Letters Patent No. 512,791, dated January 16, 1894.

Application filed August 31, 1892. Serial No. 444,658. (No model.)

*To all whom it may concern:*

Be it known that I, ADDISON M. BACON, of Pittsburg, in the county of Allegheny and State of Pennsylvania, have invented a new and useful Improvement in Glass-Melting Furnaces, of which the following is a full, clear, and exact description, reference being had to the accompanying drawings, forming part of this specification, in which—

Figure 5:
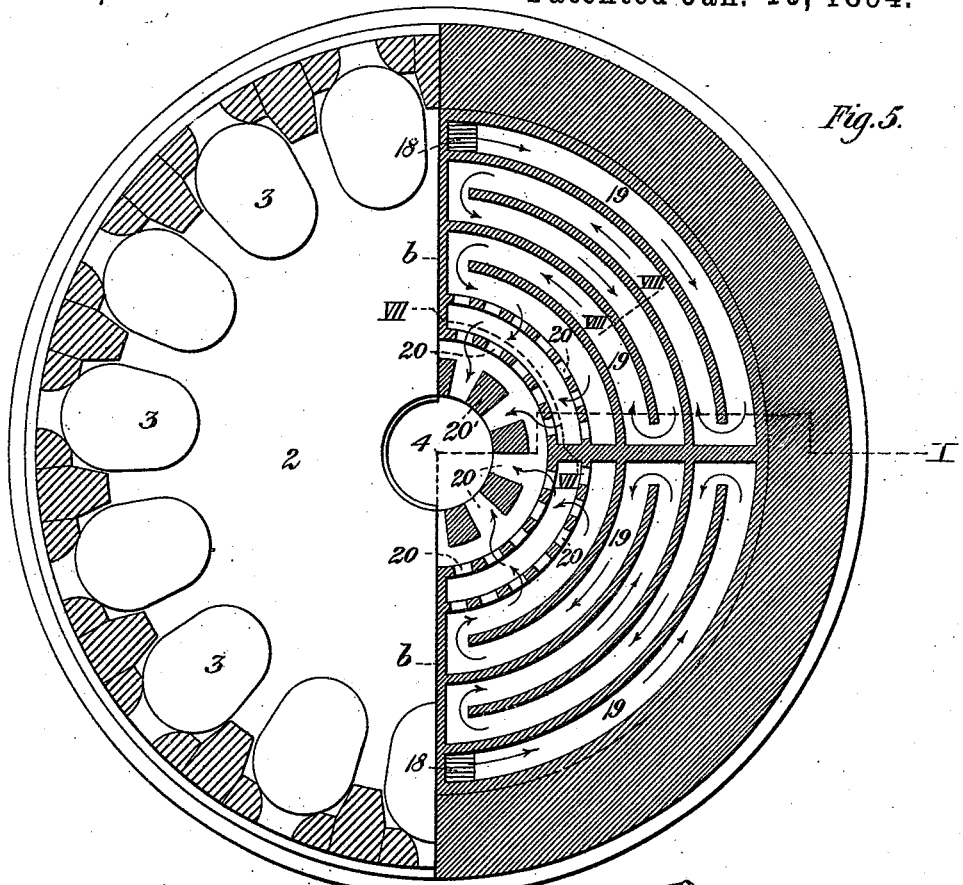
Figure 7:
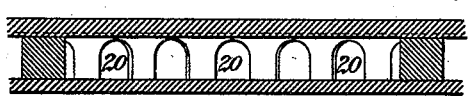
Figure 8:
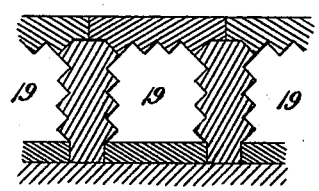
Figure 6:
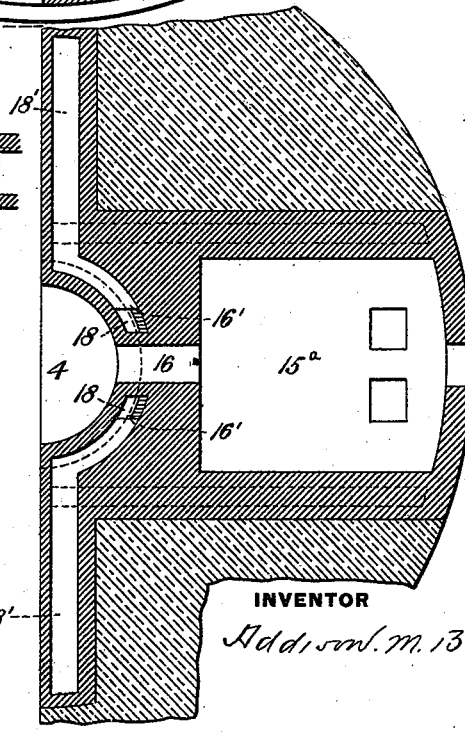

Figure 1 is a view of a glass-melting furnace embodying my invention, one half of the figure being in side elevation, and one-half being in vertical central section on the line I—I of Fig. 5. Fig. 2 is a vertical section on the line II—II of Fig. 1. Fig. 3 is a horizontal section on the section planes whose level is shown by the irregular line III—III of Fig. 1. Fig. 4 is a view, partly in front elevation and partly in vertical section, on the irregular line IV—IV of Fig. 3. Fig. 5 is a horizontal section on the line V—V of Fig. 1, one-half of the figure being in section on the plane of the glass-melting pots, and one-half thereof being taken on the plane of the ports which discharge the heated air into the eye of the furnace. Fig. 6 is a horizontal section on the line VI—VI of Fig. 1. Fig. 7 is a vertical section on the curved line VII—VII of Fig. 5, showing one of the air-flues with its air-delivery ports. Fig. 8 is a vertical cross-section on the line VIII—VIII of Fig. 5, showing the corrugated walls of the air-heating flues.

Like symbols of reference indicate like parts in each of the views.

In the drawings, 2 represents the bench of a pot-furnace for melting glass, having a series of melting-pots 3, and a central eye 4, from which come the burning gases by which the pots are heated. The furnace is preferably provided with two opposite gas-producers, both of which discharge into the eye 4, but their construction is or may be the same, and the description of one will suffice.

5 is the producer-chamber having at the base grate-bars 6, and at its upper part an opening 7 through which coal is supplied. Below the opening 7 in the producer-chamber is a shelf or trough 8, which extends from the front of the chamber toward the back, but terminates short of the latter. The coal fed into the chamber falls upon this shelf and is supported thereby. The shelf is upheld by a suitable supporting wall or arch 9, having perforations 10, affording direct communication between the upper and lower parts of the producer-chamber.

11 is a pipe which discharges into the ash-pit below the grate-bars 6. It has a nozzle 12, into which is discharged a jet of steam from a pipe 13 in such manner that the jet of steam will induce with it a current of air and that the steam and air shall be discharged together into the space below the grate-bars.

At the upper end of the producer-chamber 5, and preferably directly above the shield 8, are ports opening into a transverse flue 15ª, which discharges through a port 16 into the eye of the furnace. The air which supports the combustion of the producer gas is supplied thereto after passage through a recuperative flue or series of such flues. This flue or series of flues is constituted by making hollow the sides, back-walls and top wall of the producer-chamber, as shown at 15, communicating above the level of the base of the furnace eye with a vertical space 15' extending half way around the cylinder. This space 15' is divided by a vertical partition wall as shown in Fig. 3, so as to divide the connected flue into two parts, each extending on one side of the producer-chamber one-half of the back wall, and one-quarter of the furnace eye. Each of these connected series of spaces is provided with horizontal partition walls 16', extending across the same. These walls are provided with vertical ports $b$ arranged alternately at opposite ends, so that the spaces are divided into two series of zig-zag flues, jacketing the sides and back of the producer-chamber, and one-half of the furnace eye, through which flue the air passes upwardly. The horizontal space $c$ in the top wall or arch of the producer-chamber communicates with and forms part of the last pass of the zig-zag series of flues in the space 15 and constitute the final passage of the air through the wall-flues. In traversing the same the air is heated by conduction through the walls from the producer-chamber on the under side and from the flue 15 above; the series of air flues receive their air through ports 17 at the bottom and discharge it through top ports or passages 18 at the upper ends of the series into outwardly-extending horizontal flues 18' which enter the ends of series of flues 19 constituted by a hollow space directly under the bench of the furnace provided with oppositely-extending baffle-walls and in concentric curves, as shown in Figs. 1, 2 and 5. The bricks forming the walls of these flues are corrugated or roughened, as shown in Figs. 1 and 8, so as to afford a greater heat-radiating surface. The air enters at the outer ends of the series of flues 19, and after passing back and forth through said series of flues and approaching the center of the furnace, as shown in Fig. 5, travels through cross-ports 20 (Figs. 5 and 7) formed in inner walls 20', and enters the eye of the furnace in proximity to the place of entrance of the producer-gas. The air space under the bench on each side of the furnace, like the wall flues of the producer, is preferably divided by a partition-wall into two distinct series of flues.

The operation of the producer is as follows: A fire having been started on the grate-bars 6, and the producer-chamber heated thereby, coal is fed into the chamber through the opening 7 upon the shelf 8, where it rests, and being heated by the fire below and by the passage over it of the hot products of combustion, is roasted and to some extent parts with its volatile hydrocarbon. From time to time fresh coal is fed on to the shelf, and coal previously fed thereon and now coked or partially coked, is pushed over and drops into the chamber 5, where it rests upon the grate-bars 6. The gas is produced by the injection through the coal and producer-chamber of a current of air and steam from the pipe 11, the air maintaining incomplete combustion of the coal, and the steam being converted into water-gas. The work of feeding coal upon the shelf and subsequently pushing it into the producer-chamber is maintained continuously throughout the operation of the producer. The ports 10 at the sides of the shelf 8, by causing better contact of the hot gases from the producer chamber with the shelf hasten the heating and roasting of the coal. This is aided by the passage of the hot gases over the coal and by the exposure of the bottom of the shelf to the radiated heat from the fuel in the chamber 5, so that the coal is roasted as if in an open retort. By effecting such heating and roasting before the steam has passed through the coal, the production of gas is accelerated and made regular.

In the operation of the furnace the gas enters the eye through the port 16. The air which passes through the series of flues as above described, is highly heated in its passage by the absorption of heat from the walls of the producer-chamber and is superheated by passage through the horizontal series of flues directly under the bench, so that on emerging from the ports 20 and entering the eye of the furnace, it unites with the producer-gas and burns with thorough combustion and the production of a high degree of heat.

The operation of both producers may be maintained continuously, and as the construction described above results in the production of a maximum volume of gas from a given quantity of fuel and in the best combustion, the use of my improvement results in a considerable saving.

The advantages of my invention will be appreciated by those skilled in the art.

Variations in the form, construction and general arrangement of the parts of the apparatus may be made within the scope of my invention as defined concisely in the following claims.

I claim—

1. In a glass-melting furnace, a hollow bench having partition walls forming a series of concentric curved flues, and a gas-producer discharging into the furnace and having hollow walls connected to the bench flues; substantially as described.

2. The combination of a furnace, a producer-chamber having a gas-flue discharging into the furnace, hollow walls constituting air flues, and a final air-flue communicating therewith and situate between the furnace-bench and the gas-flue, and deriving heat from both the latter; substantially as and for the purposes described.

3. In a furnace, a producer-chamber having a hollow top forming an air-flue, and a gas-discharge flue overlying said air-flue; substantially as and for the purposes described.

4. In a furnace, a producer-chamber having a hollow top forming an air-flue, a gas-discharge flue overlying said air-flue, and a second air-flue situate above the gas-discharge flue and communicating with the air-flue first named; substantially as and for the purposes described.

In testimony whereof I have hereunto set my hand this 20th day of August, A. D. 1892.

ADDISON M. BACON.

Witnesses:
THOMAS W. BAKEWELL,
H. M. CORWIN.